(12) United States Patent
Kato

(10) Patent No.: US 9,543,642 B2
(45) Date of Patent: Jan. 10, 2017

(54) ANTENNA DEVICE AND WIRELESS DEVICE

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 351 days.

(21) Appl. No.: 14/085,830

(22) Filed: Nov. 21, 2013

(65) Prior Publication Data

US 2014/0062827 A1 Mar. 6, 2014

Related U.S. Application Data

(63) Continuation of application No. PCT/JP2012/072849, filed on Sep. 7, 2012.

(30) Foreign Application Priority Data

Sep. 9, 2011 (JP) ................. 2011-196972

(51) Int. Cl.
*H01Q 1/44* (2006.01)
*H01Q 1/50* (2006.01)
*H01Q 1/38* (2006.01)
*H01Q 7/00* (2006.01)
*G06K 19/077* (2006.01)
*H01Q 1/22* (2006.01)

(52) U.S. Cl.
CPC .......... *H01Q 1/50* (2013.01); *G06K 19/07794* (2013.01); *H01Q 1/2225* (2013.01); *H01Q 1/38* (2013.01); *H01Q 7/00* (2013.01)

(58) Field of Classification Search
CPC .............. H01Q 1/38; H01Q 1/50; H01Q 7/00; H01Q 1/2225

USPC .......................... 343/856, 741, 866
See application file for complete search history.

(56) References Cited

U.S. PATENT DOCUMENTS 3,364,564 A 1/1968 Kurtz et al.
4,794,397 A 12/1988 Ohe et al.
(Continued)

FOREIGN PATENT DOCUMENTS

CA 2 279 176 A1 7/1998
DE 10 2006 057 369 A1 6/2008
(Continued)

OTHER PUBLICATIONS

Official Communication issued in International Patent Application No. PCT/JP2010/053496, mailed on Jun. 1, 2010.
(Continued)

*Primary Examiner* — Dieu H Duong
(74) *Attorney, Agent, or Firm* — Keating & Bennett, LLP

(57) ABSTRACT

An RFID tag includes an antenna element and a feed device. The antenna element includes a base sheet and a coil conductor on the upper surface thereof. The feed device includes a feed element and an RFIC. The feed element includes a base sheet and a first coil conductor and a second coil conductor on the upper surface of the base sheet. The first coil conductor and the second coil conductor are arranged on the base sheet such that magnetic flux generated in the first coil conductor and the second coil conductor constitutes a closed magnetic circuit. The feed device is adhered to a coupling portion of the antenna element. As a result, the RFIC is strongly coupled to the antenna element.

18 Claims, 18 Drawing Sheets

(56) References Cited

U.S. PATENT DOCUMENTS

| | | |
|---|---|---|
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,243,045 B1 | 6/2001 | Ishibashi |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,956,481 B1 | 10/2005 | Cole |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2001/0011012 A1 | 8/2001 | Hino et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2002/0186004 A1 | 12/2002 | Prazeres da Costa et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2003/0206095 A1 | 11/2003 | Chaloner et al. |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0001031 A1 | 1/2005 | Akiho et al. |
| 2005/0007296 A1 | 1/2005 | Endo et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0133605 A1 | 6/2005 | Koyama et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0162331 A1 | 7/2005 | Endo et al. |
| 2005/0232412 A1 | 10/2005 | Ichihara et al. |
| 2005/0236623 A1 | 10/2005 | Takechi et al. |
| 2005/0253726 A1 | 11/2005 | Yoshida et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0114159 A1 | 6/2006 | Yoshikawa et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0208900 A1 | 9/2006 | Tavassoli Hozouri |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0015549 A1 | 1/2007 | Hernandez et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0122960 A1 | 5/2007 | Aoki |
| 2007/0132591 A1 | 6/2007 | Khatri |
| 2007/0164414 A1 | 7/2007 | Dokai et al. |
| 2007/0200705 A1 | 8/2007 | Yamagajo et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0252770 A1 | 11/2007 | Kai et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0074268 A1 | 3/2008 | Shafer |
| 2008/0087990 A1 | 4/2008 | Kato et al. |
| 2008/0111695 A1 | 5/2008 | Yamagajo et al. |
| 2008/0129606 A1 | 6/2008 | Yanagisawa et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0252551 A1* | 10/2008 | Kubo .................. H01Q 1/2208 343/867 |
| 2008/0272885 A1 | 11/2008 | Atherton |
| 2009/0002130 A1 | 1/2009 | Kato |
| 2009/0008460 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0066466 A1 | 3/2009 | Arimura |
| 2009/0080296 A1 | 3/2009 | Dokai et al. |
| 2009/0096696 A1 | 4/2009 | Joyce, Jr. et al. |
| 2009/0109034 A1 | 4/2009 | Chen et al. |
| 2009/0109102 A1 | 4/2009 | Dokai et al. |
| 2009/0134979 A1 | 5/2009 | Tsukamoto et al. |
| 2009/0140947 A1 | 6/2009 | Sasagawa et al. |
| 2009/0160719 A1 | 6/2009 | Kato et al. |
| 2009/0201116 A1 | 8/2009 | Orihara |
| 2009/0201156 A1* | 8/2009 | Kato ................ G06K 19/07749 340/572.5 |

(56) References Cited

U.S. PATENT DOCUMENTS

| | | |
|---|---|---|
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0182211 A1* | 7/2010 | Peters .............. G06K 19/06009 343/730 |
| 2010/0283694 A1 | 11/2010 | Kato |
| 2010/0308118 A1 | 12/2010 | Kataya et al. |
| 2011/0031320 A1 | 2/2011 | Kato et al. |
| 2011/0063184 A1 | 3/2011 | Furumura et al. |
| 2011/0080331 A1 | 4/2011 | Kato |
| 2011/0186641 A1 | 8/2011 | Kato et al. |
| 2011/0253795 A1 | 10/2011 | Kato |
| 2012/0001701 A1 | 1/2012 | Taniguchi et al. |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| GB | 2 305 075 A | 3/1997 |
| GB | 2461443 A | 1/2010 |
| GB | 2470299 A | 11/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-088586 A | 4/1996 |
| JP | 08-88586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-093029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 09-294374 A | 11/1997 |
| JP | 9-512367 A | 12/1997 |
| JP | 10-69533 A | 3/1998 |
| JP | 10-069533 A | 3/1998 |
| JP | 10-084406 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 2834584 B2 | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-048152 A | 2/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |

(56) References Cited

FOREIGN PATENT DOCUMENTS

| | | |
|---|---|---|
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-245416 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-324221 A | 11/2002 |
| JP | 2002-325013 A | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-108966 A | 4/2003 |
| JP | 2003-110344 A | 4/2003 |
| JP | 2003-132330 A | 5/2003 |
| JP | 2003-134007 A | 5/2003 |
| JP | 2003-139866 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-506905 A | 3/2004 |
| JP | 2004-104344 A | 4/2004 |
| JP | 2004-121412 A | 4/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166175 A | 6/2004 |
| JP | 2004-166176 A | 6/2004 |
| JP | 2004-172919 A | 6/2004 |
| JP | 2004-213582 A | 7/2004 |
| JP | 2004-519916 A | 7/2004 |
| JP | 2004/070879 A | 8/2004 |
| JP | 2004-234595 A | 8/2004 |
| JP | 2004-253858 A | 9/2004 |
| JP | 2004-527864 A | 9/2004 |
| JP | 2004-280390 A | 10/2004 |

(56) References Cited

FOREIGN PATENT DOCUMENTS

| | | |
|---|---|---|
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-336604 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-006096 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-202943 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-328259 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-013120 A | 1/2007 |
| JP | 2007-18067 A | 1/2007 |
| JP | 2007-019905 A | 1/2007 |
| JP | 2007-028002 A | 2/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-068073 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-194924 A | 8/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |
| JP | 2007-266999 A | 10/2007 |
| JP | 2007-272264 A | 10/2007 |
| JP | 2007-279782 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042379 A | 2/2008 |
| JP | 2008-042910 A | 2/2008 |
| JP | 2008-72243 A | 3/2008 |

(56) References Cited

FOREIGN PATENT DOCUMENTS

| | | |
|---|---|---|
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-118359 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |
| JP | 2008-226099 A | 9/2008 |
| JP | 2008-244739 A | 10/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111950 A | 5/2009 |
| JP | 2009-111986 A | 5/2009 |
| JP | 2009-130896 A | 6/2009 |
| JP | 2009-135166 A | 6/2009 |
| JP | 2009-524363 A | 6/2009 |
| JP | 2009-153166 A | 7/2009 |
| JP | 4301346 B2 | 7/2009 |
| JP | 2009-181246 A | 8/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-278441 A | 11/2009 |
| JP | 2009-284182 A | 12/2009 |
| JP | 2010-009196 A | 1/2010 |
| JP | 2010-015342 A | 1/2010 |
| JP | 2010-504598 A | 2/2010 |
| JP | 2010-050844 A | 3/2010 |
| JP | 2010-051012 A | 3/2010 |
| JP | 2010-051017 A | 3/2010 |
| JP | 2010-074839 A | 4/2010 |
| JP | 2010-081571 | 4/2010 |
| JP | 2010-102445 A | 5/2010 |
| JP | 2010-171857 A | 8/2010 |
| JP | 4535209 B2 | 9/2010 |
| JP | 4561932 B2 | 10/2010 |
| JP | 2010-268306 A | 11/2010 |
| JP | 2010-279029 A | 12/2010 |
| JP | 2011-015395 A | 1/2011 |
| JP | 4609604 B2 | 1/2011 |
| JP | 2011-076567 A | 4/2011 |
| JP | 2011-139533 | 7/2011 |
| JP | 2011-142648 A | 7/2011 |
| JP | 2011-205384 A | 10/2011 |
| JP | 2012-033021 A | 2/2012 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/013168 A1 | 2/2007 |
| WO | 2007/060792 A1 | 5/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/099602 A1 | 9/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/001561 A1 | 1/2008 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/005080 A1 | 1/2009 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |
| WO | 2010/104179 A1 | 9/2010 |
| WO | 2010/119854 A1 | 10/2010 |
| WO | 2011/062274 A1 | 5/2011 |

OTHER PUBLICATIONS

Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.

(56) References Cited

OTHER PUBLICATIONS

Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed on Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.

(56) References Cited

OTHER PUBLICATIONS

Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.
Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Dokai et al.: "Wireless Communication Device"; U.S. Appl. No. 13/782,346, filed Mar. 1, 2013.
Official Communication issued in International Patent Application No. PCT/JP2012/053344, mailed on May 22, 2012.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 3, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2012/050557, mailed on Apr. 10, 2012.
Kimura et al.: "Wireless Communication Device"; U.S. Appl. No. 13/789,761, filed Mar. 8, 2013.
Dokai et al.: "RFID Chip Package and RFID Tag"; U.S. Appl. No. 13/792,650, filed Mar. 11, 2013.
Kato et al.: "Wireless IC Device Component and Wireless IC Device"; U.S. Appl. No. 13/794,929, filed Mar. 12, 2013.
Kato et al.: "Wireless IC Device and Component for Wireless IC Device"; U.S. Appl. No. 13/848,748, filed Mar. 22, 2013.
Official Communication issued in International Patent Application No. PCT/JP2012/080493, mailed on Dec. 25, 2012.
Mukai et al.: "Inspection Method and Inspection Device for RFID Tag"; U.S. Appl. No. 13/933,184, filed Jul. 2, 2013.
Kato et al.: "Antenna Device and Method of Setting Resonant Frequency of Antenna Device"; U.S. Appl. No. 13/941,760, filed Jul. 15, 2013.
Kato et al.: "Antenna Device and Method of Setting Resonant Frequency of Antenna Device"; U.S. Appl. No. 13/943,973, filed Jul. 17, 2013.
Official Communication issued in International Patent Application No. PCT/JP2012/080700, mailed on Jan. 15, 2013.
Mukai et al.: "Wireless Integrated Circuit Device and Method of Manufacturing the Same"; U.S. Appl. No. 13/961,995, filed Aug. 8, 2013.
Kato et al.: "Radio IC Device"; U.S. Appl. No. 13/964,234, filed Aug. 12, 2013.
Official Communication issued in International Patent Application No. PCT/JP2012/067779, mailed on Aug. 28, 2012.
Official Communication issued in International Patent Application No. PCT/JP2013/051254, mailed on Apr. 2, 2013.
Dokai: "Wireless Communication Device"; U.S. Appl. No. 13/970,633, filed Aug. 20, 2013.
Official Communication issued in International Patent Application No. PCT/JP2012/059350, mailed on Jul. 3, 2012.
Dokai: "Wireless IC Device"; U.S. Appl. No. 14/011,823, filed Aug. 28, 2013.
Official Communication issued in International Patent Application No. PCT/JP2012/055505, mailed on Jun. 5, 2012.
Kato: "Radio IC Device and Radio Communication Terminal"; U.S. Appl. No. 14/017,406, filed Sep. 4, 2013.
Official Communication issued in International Patent Application No. PCT/JP2012/067454, mailed on Aug. 7, 2012.
Kato: "Antenna Device and Communication Terminal Apparatus"; U.S. Appl. No. 14/019,573, filed Sep. 6, 2013.
Official Communication issued in International Patent Application No. PCT/JP2012/67537, mailed on Oct. 9, 2012.
Kato: "Radio Communication Device"; U.S. Appl. No. 14/027,384, filed Sep. 16, 2013.
Kato: "Antenna Device, RFID Tag, and Communication Terminal Apparatus"; U.S. Appl. No. 14/031,270, filed Sep. 19, 2013.
Kato et al.: "Wireless IC Device"; U.S. Appl. No. 14/054,865, filed Oct. 16, 2013.
Official Communication issued in International Patent Application No. PCT/JP2012/062259, mailed on Jun. 12, 2012.
Dokai et al.: "Radio IC Device"; U.S. Appl. No. 14/078,596, filed Nov. 13, 2013.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.

(56) References Cited

OTHER PUBLICATIONS

Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.

Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official communication issued in Japanese Application No. 2007-531524, mailed on Sep. 11, 2007.
Official communication issued in Japanese Application No. 2007-531525, mailed on Sep. 25, 2007.

(56) References Cited

OTHER PUBLICATIONS

Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags")", RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in International Patent Application No. PCT/JP2012/072849, mailed on Nov. 20, 2012.
Kimura et al.: "Wireless Communication Device"; U.S. Appl. No. 14/082,435, filed Nov. 18, 2013.

\* cited by examiner

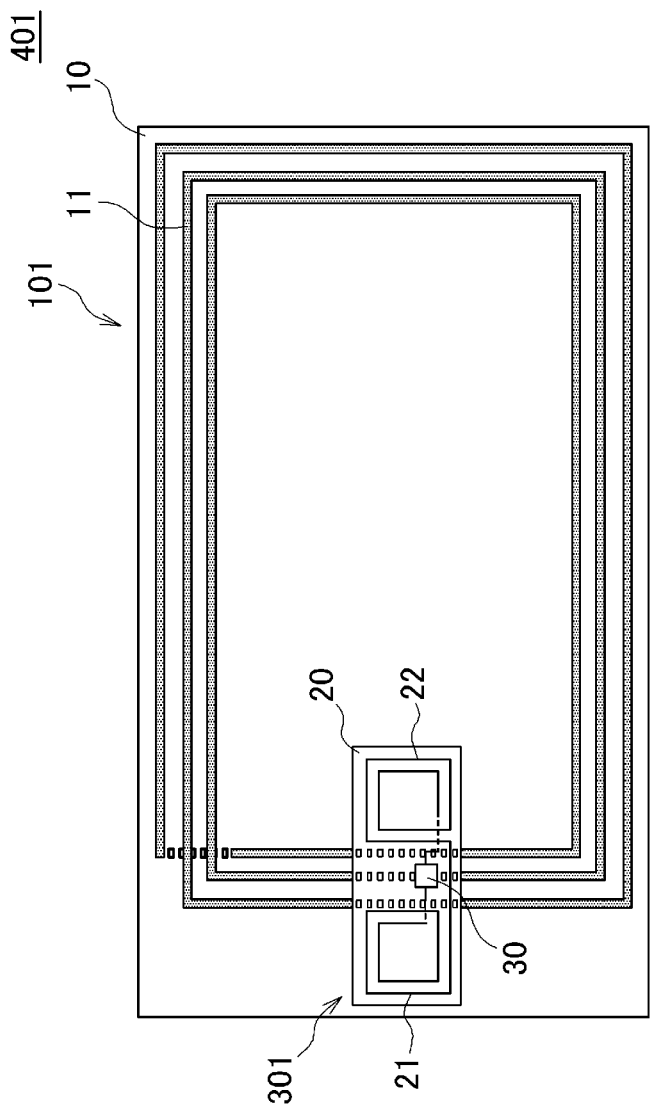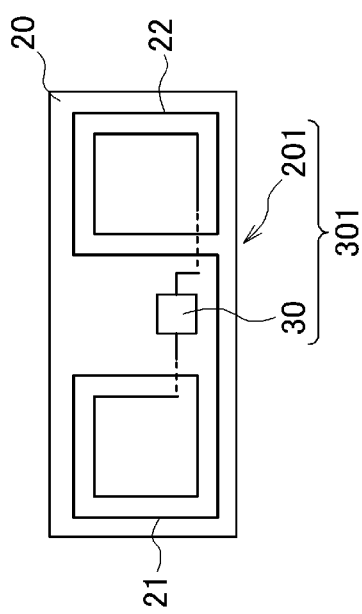

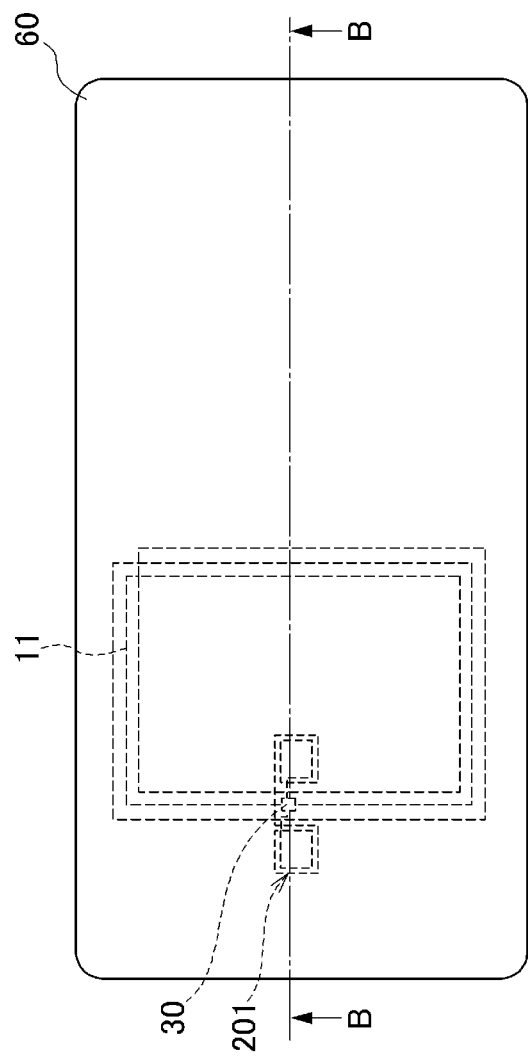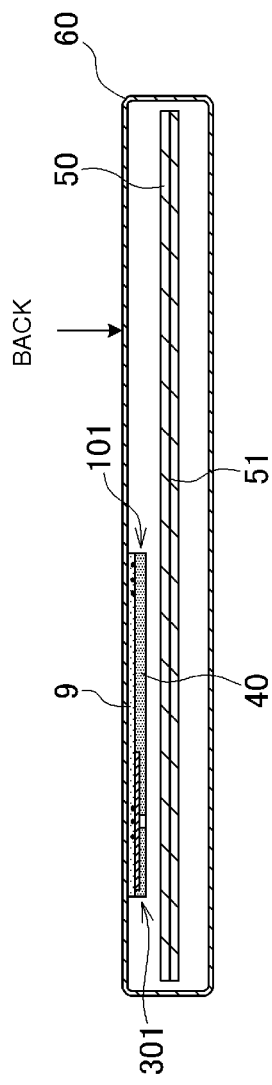
FIG. 6A
FIG. 6B

ANTENNA DEVICE AND WIRELESS DEVICE

BACKGROUND OF THE INVENTION

1. Field of the Invention

The present invention relates to an antenna device and a wireless device including the same.

2. Description of the Related Art

The radio frequency identification (RFID) system, in which a reader/writer and an RFID tag communicate with each other in a non-contact manner to transmit information between the reader/writer and the RFID tag, has become widespread. Such an RFID tag and a reader/writer include a radio frequency integrated circuit (RFIC) chip that processes high frequency signals and an antenna element that emits or receives high frequency signals. Examples of known RFID systems include the HF-band RFID system using the 13 MHz band, such as FeliCa®, and the UHF-band RFID system using the 900 MHz band which is used in warehouse management and the like.

A general RFID tag often adopts bonding that uses a gold bump for connecting an RFIC chip to an antenna element. This type of bonding, however, uses ultrasonic waves and therefore the bonding process is complicated. As a result, high connection reliability may not be ensured.

Accordingly, techniques disclosed in Japanese Patent Registration No. 2834584, Japanese Unexamined Patent Application Publication No. 2008-211572, and Japanese Unexamined Patent Application Publication No. 2009-111950 are known in which a feed coil is connected to an RFIC chip and the feed coil is connected to a main antenna via an electromagnetic field.

In an RFID tag in which a feed coil is connected to an RFIC chip and the feed coil is coupled to a main antenna via an electromagnetic field, connection between the RFIC chip and an antenna element can be readily made, however, this coupling is negligibly enhanced and, when a signal or electromagnetic energy received by the main antenna is transmitted to the RFIC chip, insertion loss may increase. As a result, the maximum communication distance may not be attained.

This is not only a problem for an RFID tag but is a problem also for an antenna device to which a feeder circuit including an RFIC is connected and a wireless device including the same.

SUMMARY OF THE INVENTION

Preferred embodiments of the present invention provide an antenna device in which an RFIC is strongly coupled to an antenna element, and a wireless device.

An antenna device according to a preferred embodiment of the present invention includes an antenna element including a coupling portion; and a feed element including a first coil conductor and a second coil conductor, the first coil conductor and the second coil conductor being arranged such that magnetic flux generated in the first coil conductor and the second coil conductor constitutes a closed magnetic circuit, wherein the feed element and the antenna element are disposed such that the closed magnetic circuit of the feed element extends around the coupling portion of the antenna element.

Preferably, the first coil conductor and the second coil conductor respectively have different winding axes and are electrically connected in series to each other.

Preferably, the antenna element includes a spiral or loop-shaped coil conductor, the coupling portion is part of the coil conductor, and the feed element is disposed across the coupling portion of the antenna element such that the first coil conductor and the second coil conductor are positioned on respective sides of the coupling portion.

Preferably, the first coil conductor and the second coil conductor are disposed adjacent to each other on the same plane.

Preferably, the first coil conductor and the second coil conductor are asymmetric to each other.

Preferably, the first coil conductor and the second coil conductor are provided on a base sheet.

Preferably, the antenna element has a resonance frequency that corresponds to a carrier frequency of a communication signal.

A wireless device according to another preferred embodiment of the present invention includes an antenna element including a coupling portion; a feed element including a first coil conductor and a second coil conductor, the first coil conductor and the second coil conductor being arranged such that magnetic flux generated in the first coil conductor and the second coil conductor constitutes a closed magnetic circuit; and an RFIC that is connected to the first coil conductor and the second coil conductor of the feed element, wherein the feed element and the antenna element are disposed such that the closed magnetic circuit of the feed element extends around the coupling portion of the antenna element.

Preferably, the RFIC and the feed element constitute a resonant circuit that resonates at a frequency corresponding to a carrier frequency of a communication signal.

According to the antenna device of various preferred embodiments of the present invention, a coupling portion of an antenna element which is coupled to a feed element is disposed in a closed magnetic circuit constituted by coil conductors of the feed element and therefore the feed element and the antenna element can be coupled to each other more strongly. As a result, lower insertion loss is attained in the transmission characteristics when a signal received by the antenna element is transmitted to the RFIC.

Furthermore, use of the wireless device according to various preferred embodiments of the present invention in an RFID tag or in a reader/writer increases the maximum communication distance of the RFID tag or reader/writer.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a plan view of the RFID tag 401, and FIG. 2B is a plan view of a feed device 301.

FIG. 6A is a plan view of the back of a communication terminal apparatus according to a fourth preferred embodiment of the present invention. FIG. 6B is a cross-sectional view taken along the line B-B in FIG. 6A.

DETAILED DESCRIPTION OF THE PREFERRED EMBODIMENTS

First Preferred Embodiment

Figure 1:
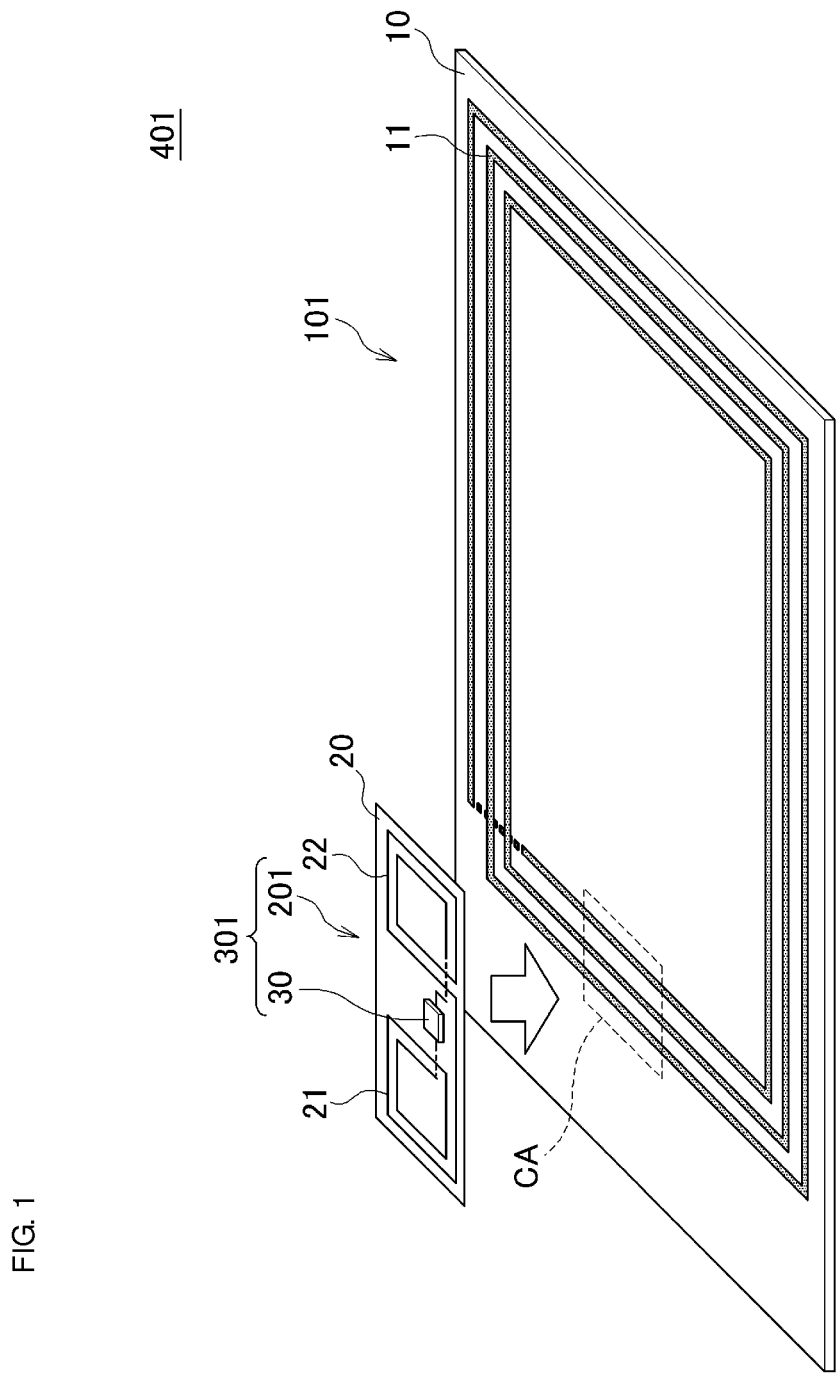
FIG. 1 is an exploded perspective view of an RFID tag 401 according to a first preferred embodiment of the present invention.

FIG. 1 is an exploded perspective view of an RFID tag 401 according to a first preferred embodiment of the present invention. FIG. 2A is a plan view of the RFID tag 401, and FIG. 2B is a plan view of a feed device 301.

In this example, the RFID tag 401 is an RFID tag for an HF-band RFID system and includes an antenna element 101 and the feed device 301. The antenna element 101 preferably includes a base sheet 10 made of PET or the like and a coil conductor 11 located on the upper surface thereof. The feed device 301 preferably includes a feed element 201 and an RFIC 30.

The RFIC 30 is an IC chip for RFID. The RFIC 30 preferably includes a memory circuit, a logic circuit, and the like.

The feed element 201 preferably includes a base sheet 20 made of PET or the like, and a first coil conductor 21 and a second coil conductor 22 located on the upper surface of the base sheet 20.

As described below in detail, the first coil conductor 21 and the second coil conductor 22 are arranged (wound and disposed) on the base sheet 20 such that magnetic flux generated in the first coil conductor 21 and the second coil conductor 22 constitutes a closed magnetic circuit.

The feed device 301 is disposed close to a coupling portion CA of the antenna element 101. For example, the feed device 301 is adhered to the coupling portion CA with a double-sided adhesive sheet therebetween. The feed element 201 is disposed relative to the antenna element 101 such that the closed magnetic circuit of the feed element 201 extends around the coupling portion CA of the antenna element 101 in a state where the feed device 301 is disposed close to the coupling portion CA of the antenna element 101.

Figure 3:
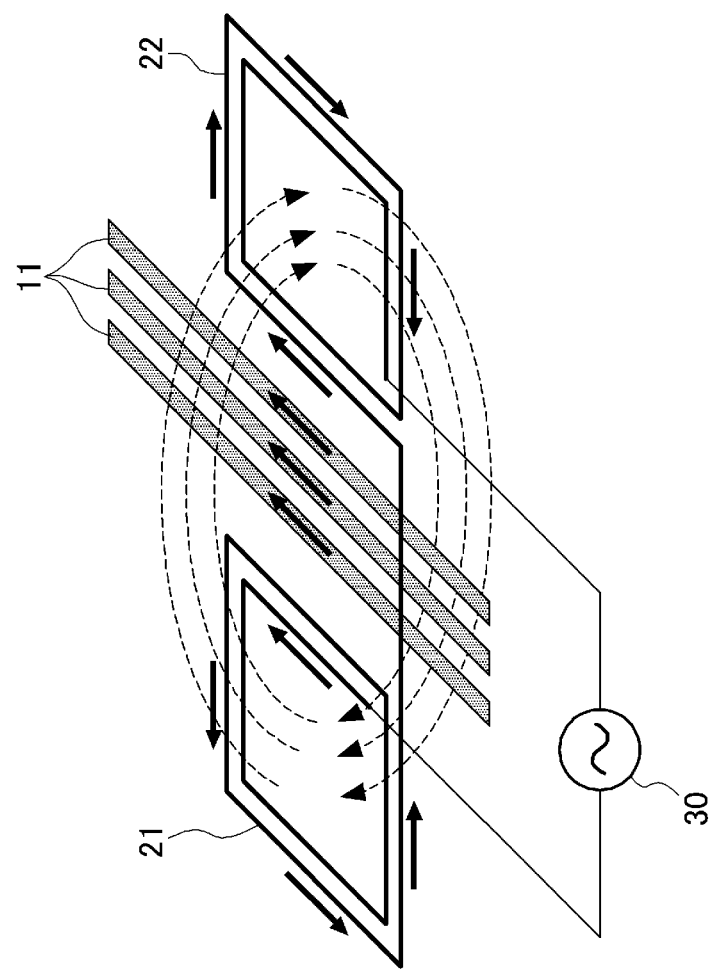
FIG. 3 is a diagram illustrating the relationship between magnetic flux generated in a first coil conductor 21 and a second coil conductor 22 of a feed element 201, and a coil conductor 11 of an antenna element 101.

FIG. 3 is a diagram illustrating the relationship between magnetic flux generated in the first coil conductor 21 and the second coil conductor 22 of the feed element 201, and the coil conductor 11 of the antenna element 101. When a current flows in the coil conductor 11 of the antenna element 101 in the direction shown by the straight arrows in FIG. 3, magnetic flux shown by the dashed arrows is present around the circumference of the coil conductor 11. The magnetic flux is interlinked with loop planes of the first coil conductor 21 and the second coil conductor 22 of the feed element 201. The first coil conductor 21 and the second coil conductor 22 are connected in series to each other so that an electromotive force of the first coil conductor 21 and an electromotive force of the second coil conductor 22 in this case are added together, and are also connected to the RFIC 30. The electromotive forces excited by the first coil conductor 21 and the second coil conductor 22 of the feed element 201 are therefore fed to the RFIC 30. Conversely, when a current is fed from the RFIC 30 to the first coil conductor 21 and the second coil conductor 22, magnetic flux passing through the loop planes of the first coil conductor 21 and the second coil conductor 22 extends around the circumference of the coil conductor 11 of the antenna element, and a current is excited in the coil conductor 11.

As described above, the two coil conductors (the first coil conductor 21 and the second coil conductor 22) respectively having different winding axes are disposed across the coupling portion CA in the coil conductor 11 of the antenna element so as to be positioned on respective sides of the coupling portion CA, and the first coil conductor 21 and the second coil conductor 22 are connected to each other such that the magnetic flux that passes through the first coil conductor 21 and the second coil conductor 22 extends around the vicinity of the coil conductor 11 of the antenna element (extends around along the closed magnetic circuit).

The first coil conductor 21 and the second coil conductor 22 are preferably disposed adjacent to each other on the same plane. More specifically, the first coil conductor 21 and the second coil conductor 22 are preferably arranged such that the closed magnetic circuit is located in a plane perpendicular or substantially perpendicular to the coil planes of the coil elements and such that the coupling portion of the antenna element extends in the direction perpendicular or substantially perpendicular to the plane on which the closed magnetic circuit is provided (the magnetic flux loop plane).

The first coil conductor 21 and the second coil conductor 22 preferably have respective winding axes that are parallel or substantially parallel to each other. This allows the magnetic flux passing through the first coil conductor 21 and the second coil conductor 22 to readily go around along the closed magnetic circuit, making coupling to the coil conductor 11 of the antenna element more secure.

In the example illustrated in FIG. 1 and FIG. 2, the RFID tag 401 is preferably formed by adhering the feed device 301, in which the RFIC 30 has been mounted on the feed element 201, to the antenna element 101. However, the RFIC 30 may preferably be mounted on the feed element 201 after the feed element 201 has been adhered to the antenna element 101. That is, the antenna device may preferably be constituted by the antenna element 101 and the feed element 201, without the RFIC 30 being mounted.

In a preferred embodiment of the present invention, the coupling portion of the antenna element preferably is provided in the closed magnetic circuit provided in the feed element and therefore the feeder circuit and the antenna element are coupled to each other via an electromagnetic field (mainly via a magnetic field). Accordingly, the coil elements and the antenna element are securely coupled to each other, making a wireless device having low insertion loss possible. Furthermore, the feed element constitutes the closed magnetic circuit and therefore, even if a metal body such as a ground conductor or a battery pack is provided in the vicinity of the feed element, there is little chance that formation of a magnetic field is prevented by such a metal body or a magnetic field is lost as an eddy current due to the metal body. Therefore, use of the antenna device and the wireless device according to a preferred embodiment of the present invention in an RFID tag or in a reader/writer increases the communication distance of the RFID tag or reader/writer.

In a preferred embodiment of the present invention, the antenna element preferably has a resonance frequency corresponding to the carrier frequency of the communication signal for the purpose of maximizing the communication distance. For the same reason, the RFIC and the feed element also preferably have a resonance frequency corresponding to the carrier frequency of the communication signal. As also described in the preferred embodiments described below, the resonance frequency constituted by the RFIC and the feed element is determined by the stray capacitance of the RFIC and the inductance (and the line capacitance) of the feeder circuit.

Second Preferred Embodiment

In a second preferred embodiment of the present invention, a structure of an antenna element which is different from that in the first preferred embodiment is described.

Figure 4A:
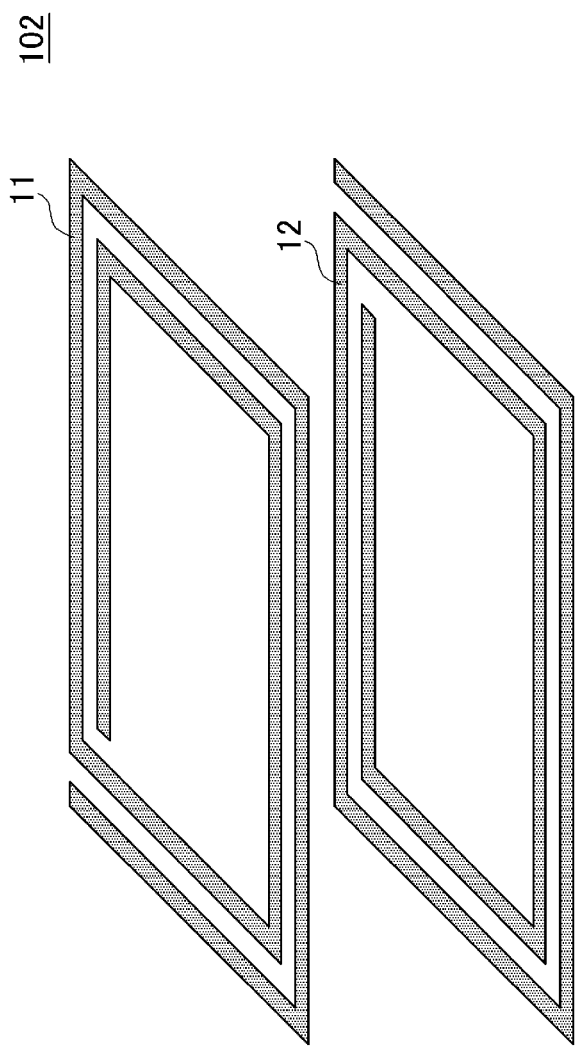
FIG. 4A is an exploded perspective view of coil conductors 11 and 12 included in an antenna element 102 according to a second preferred embodiment of the present invention.

FIG. 4A is an exploded perspective view of coil conductors 11 and 12 included in an antenna element 102. The coil conductor 11 is located on a first main surface of a base sheet (not illustrated in FIG. 4) and the coil conductor 12 is located on a second main surface of the base sheet.

Figure 4B:
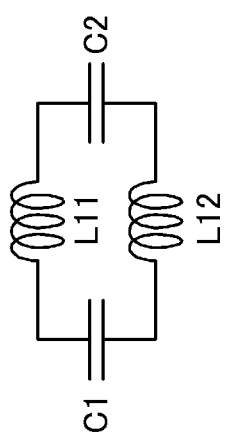
FIG. 4B is an equivalent circuit diagram of the antenna element 102 illustrating the case where the two coil conductors 11 and 12 face each other with a base sheet interposed therebetween.
Figure 4C:
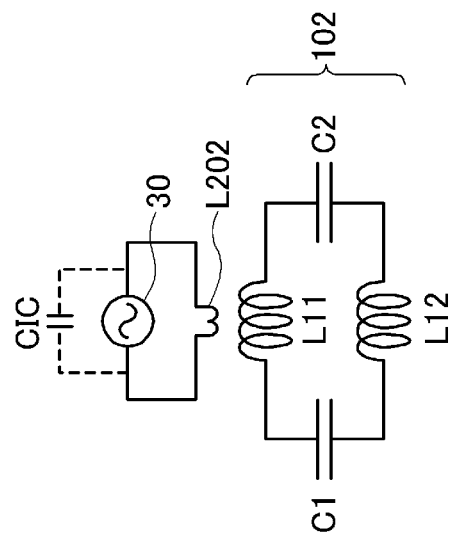
FIG. 4C is an equivalent circuit diagram illustrating the case where a feed device is coupled to the antenna element.

FIG. 4B is an equivalent circuit diagram of the antenna element 102 illustrating the case where the two coil conductors 11 and 12 face each other with the base sheet interposed therebetween. FIG. 4C is an equivalent circuit diagram illustrating the case where the feed device is coupled to the antenna element.

As illustrated in FIG. 4A, the coil conductor 11 and the coil conductor 12 of the antenna element 102 are preferably arranged in a rectangular or substantially rectangular spiral pattern. The winding direction of the coil conductor 11 is opposite to the winding direction of the coil conductor 12 (the same direction when viewed from one direction) and the coil conductors are electromagnetically coupled to each other. In FIG. 4B, an inductor L11 represents an inductance caused by the coil conductor 11 with a symbol, and an inductor L12 represents an inductance caused by the coil conductor 12 with a symbol. Capacitors C1 and C2 each represent a capacitance generated between the coil conductor 11 and the coil conductor 12 with a symbol of a lumped constant. In this way, the coil conductors 11 and 12 of the antenna element 102 constitute an LC circuit.

In FIG. 4C, an inductor L202 represents an inductance caused by a coil conductor that constitutes the feed element with a symbol. When the coil conductor of the feed element is electromagnetically coupled to the coil conductors 11 and 12 of the antenna element, the antenna element 102 operates as an antenna for the HF band. A capacitor CIC represents a capacitance connected to the coil conductor of the feed element, such as the parasitic capacitance of the RFIC 30, with a symbol. The capacitor CIC and the inductor L201 perform LC resonance. When the two LC resonance circuits, the RFIC 30 and the antenna element 102, are electromagnetically (mainly magnetically) coupled to each other, signals are transmitted between the antenna element 102 and the RFIC 30. Accordingly, the antenna element 102 operates as a resonance booster.

Third Preferred Embodiment

In a third preferred embodiment of the present invention, a structure of a feed element and a feed device, which is different from that in the first preferred embodiment, is described.

Figure 5:
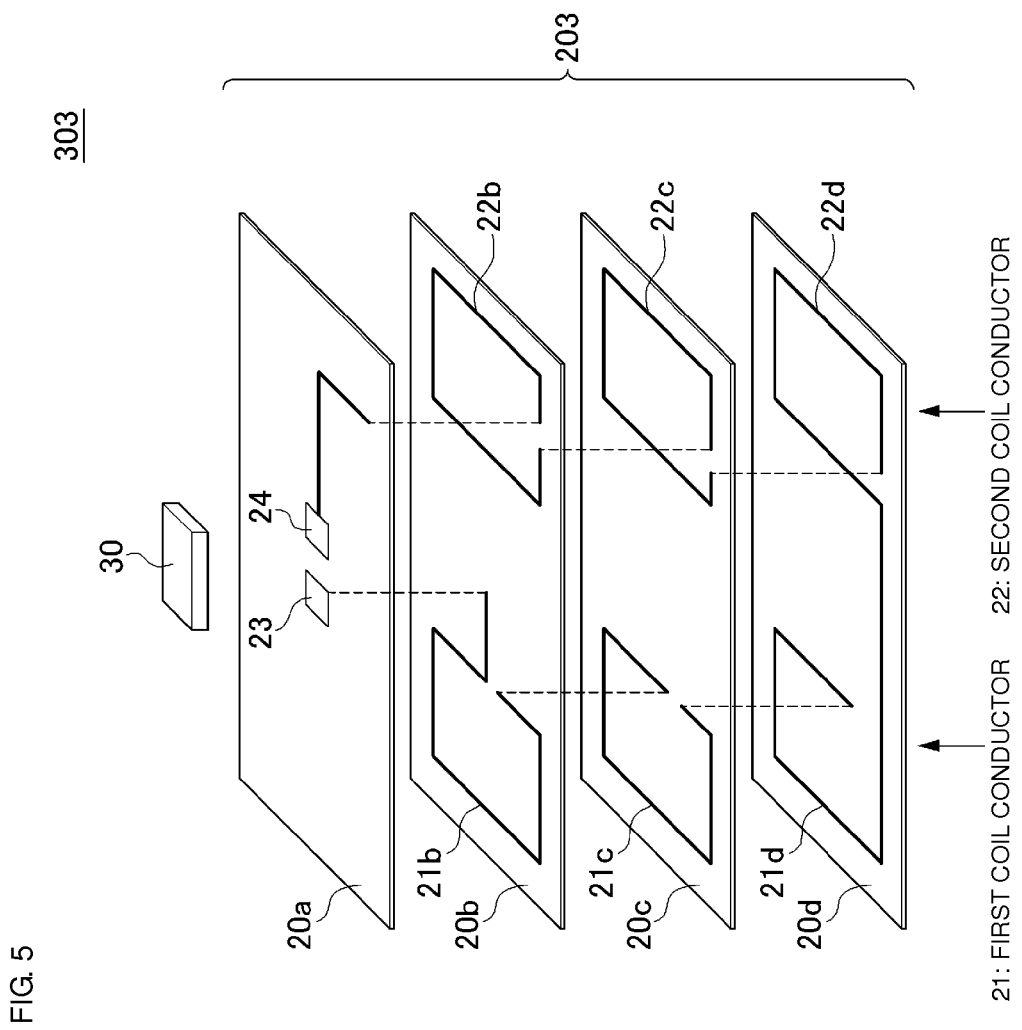
FIG. 5 is an exploded perspective view of a feed element 203 and a feed device 303 according to a third preferred embodiment of the present invention.

FIG. 5 is an exploded perspective view of a feed element 203 and a feed device 303 according to the third preferred embodiment. The feed element 203 includes a plurality of stacked dielectric base sheets on each of which a pattern of a coil conductor or the like is provided. Terminals 23 and 24 to connect the RFIC 30 are provided on a base sheet 20a. Coil conductors 21b and 22b are provided on a base sheet 20b. Coil conductors 21c and 22c are provided on a base sheet 20c. Coil conductors 21d and 22d are provided on a base sheet 20d. Via conductors are provided on each of the base sheets as shown by the dashed lines in FIG. 5 to define inter-layer connections.

The coil conductors 21b, 21c, and 21d and the via conductors connecting these coil conductors constitute the first coil conductor 21. The coil conductors 22b, 22c, and 22d and the via conductors connecting these coil conductors constitute the second coil conductor 22. In this way, the first coil conductor 21 and the second coil conductor 22 are arranged on the base sheets 20a, 20b, 20c, and 20d such that magnetic flux generated in the first coil conductor 21 and the second coil conductor 22 constitutes a closed magnetic circuit.

In this way, the helical first coil conductor 21 and second coil conductor 22 are provided in a dielectric ceramic multilayer substrate. With this structure, a large coil opening is achieved even if the number of windings is increased. Therefore, even if the number of windings of the coil conductor of the feed element is increased, the feed element is strongly magnetically coupled to the coil conductor of the antenna element.

Fourth Preferred Embodiment

In a fourth preferred embodiment of the present invention, an example of a communication terminal apparatus including an RFID tag is described.

Figure 7:
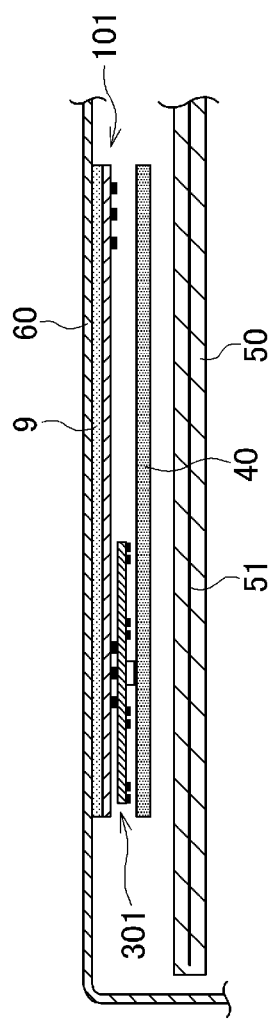
FIG. 7 is an enlarged cross-sectional view of an RFID tag portion.

FIG. 6A is a plan view of the back of the communication terminal apparatus. FIG. 6B is a cross-sectional view taken along the line B-B in FIG. 6A. FIG. 7 is an enlarged cross-sectional view of an RFID tag portion.

A printed wiring board 50 is accommodated inside a housing 60 and a ground conductor 51 is provided inside the printed wiring board 50. An antenna element 101, a feed device 301, and the like are provided on the inner surface of the housing.

The structure of the antenna element 101 and the feed device 301 is preferably the same as that in the first preferred embodiment. As illustrated in FIG. 7, a magnetic layer 40 such as a ferrite sheet is disposed between the antenna element 101 and feed device 301 and the printed wiring board 50. The magnetic layer 40 is arranged so that the ground conductor 51 does not seem equivalent to the antenna element 101 and feed device 301. The antenna element 101 is adhered to the inner surface of the housing 60 with an adhesive layer 9 therebetween. Also the magnetic layer 40 may be adhered to the antenna element 101 and feed device 301 with a double-sided adhesive sheet or the like therebetween.

In this way, the magnetic layer is arranged to block magnetic flux that is to enter a metal such as the ground conductor to prevent generation of an eddy current. Therefore, when an antenna device is integrated into an electronic device together with a metal body, a magnetic layer such as a ferrite sheet may be disposed between the antenna device and the metal body. The antenna device may be disposed on the inner surface of the housing so that the antenna device is kept as far away from the metal body as possible and so as to make sufficient use of the space.

Note that the metal body described above includes any item in which an eddy current that counteracts a magnetic field change by a coil antenna is likely to occur due to a metal present in the item, such as a mixed molded product of resin and metal powder, an item in which a metal sheet is molded to a resin item, or a battery or a liquid crystal display having a case that includes a metal portion, in addition to a printed wiring board on which a planar conductor that extends in a planar shape (in a flat shape) is provided.

Fifth Preferred Embodiment

Figure 8:
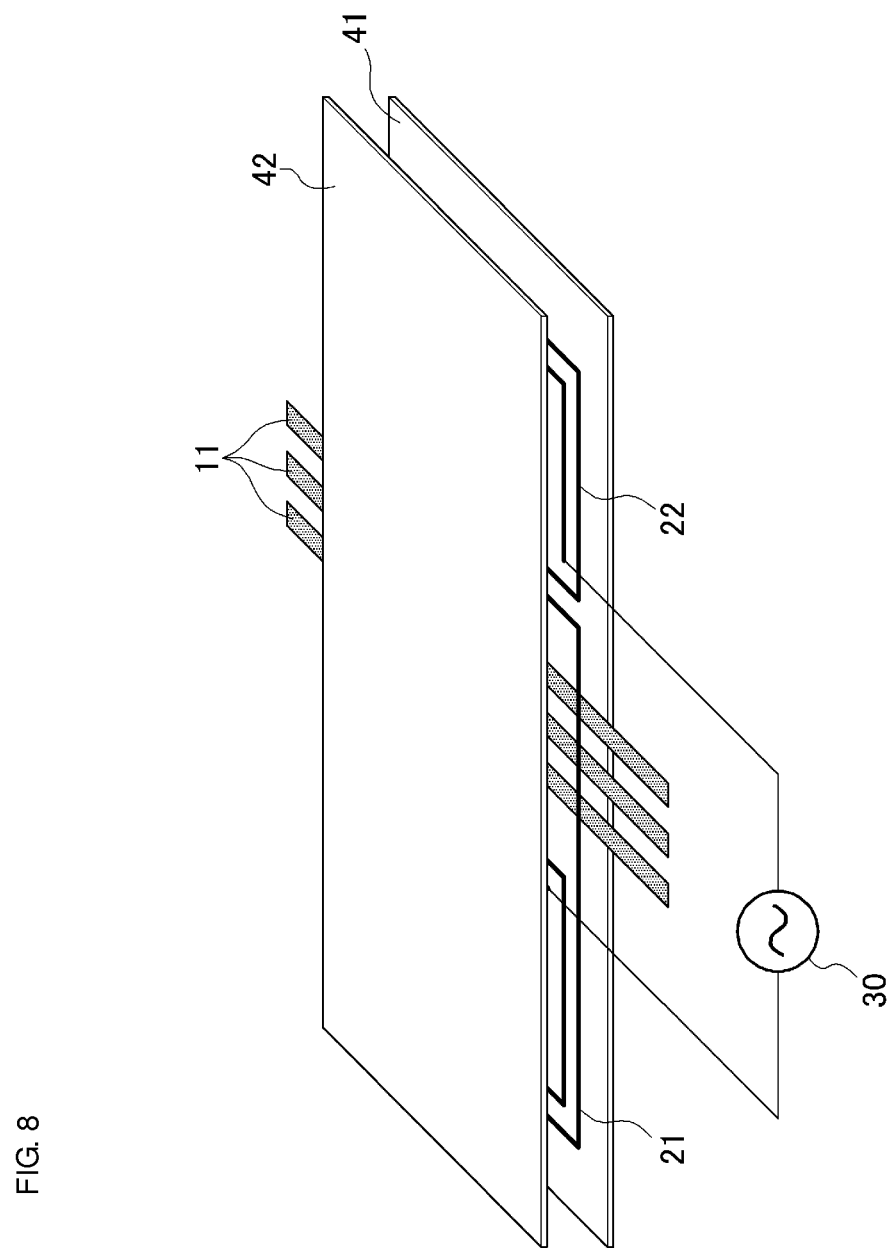
FIG. 8 is a perspective view of a main portion of an antenna device according to a fifth preferred embodiment of the present invention.

FIG. 8 is an exploded perspective view of a main portion of an antenna device according to a fifth preferred embodiment of the present invention. The antenna device includes an antenna element and a feed device. The structure of the antenna element and the feed device is preferably the same as that in the first preferred embodiment. In FIG. 8, base sheets of the antenna element and the feed device are not illustrated. Magnetic layers 41 and 42 are disposed so as to sandwich the coil conductor 11 provided in the antenna element and the first coil conductor 21 and the second coil conductor 22 provided in the feed element. The magnetic layers 41 and 42 are ferrite sheets or the like and are adhered to the antenna element and the feed device with double-sided adhesive sheets therebetween.

By sandwiching the coil conductor 11 provided in the antenna element and the first coil conductor 21 and the second coil conductor 22 provided in the feed element using the magnetic layers 41 and 42, most of the magnetic flux that passes through the first coil conductor 21 and the second coil conductor 22 passes through the magnetic layers 41 and 42. Accordingly, flux leakage is reduced and the coil conductor 11 in the antenna element and the coil conductors 21 and 22 in the feed element are coupled to each other more strongly.

Sixth Preferred Embodiment

Figure 9:
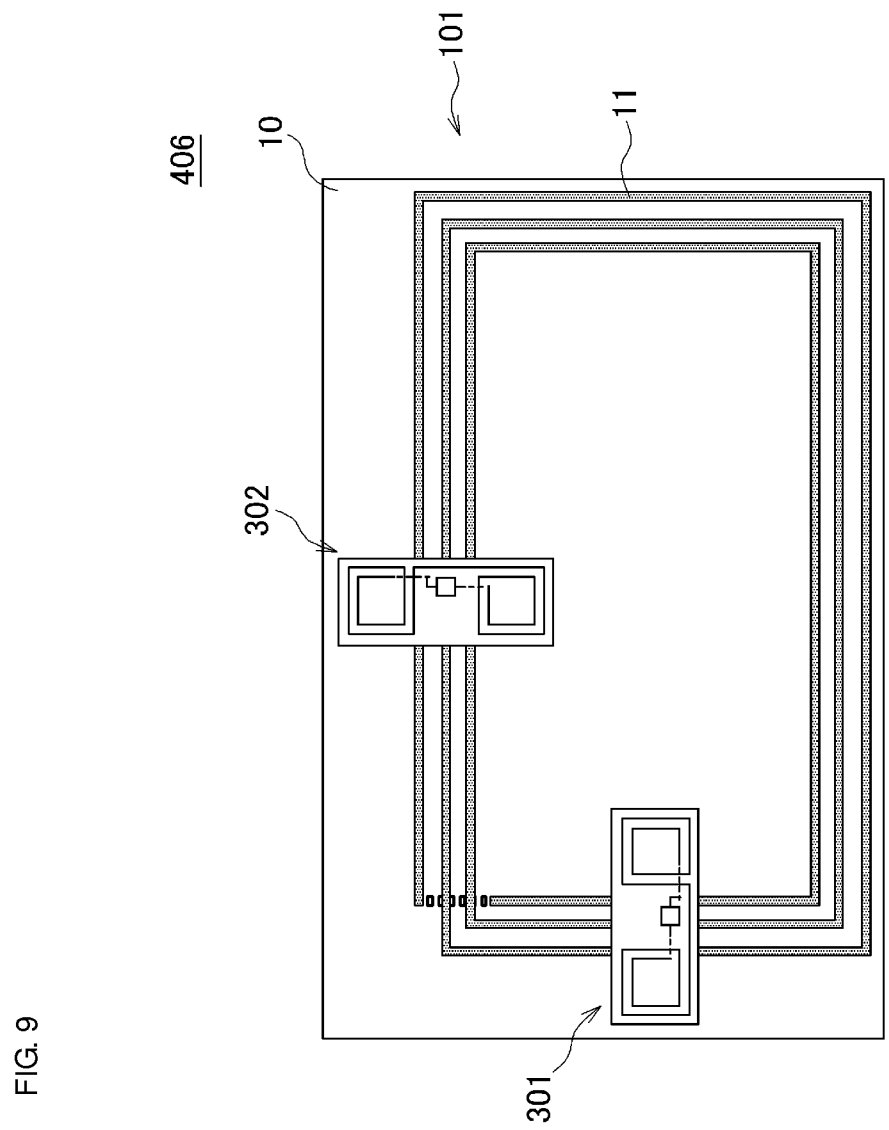
FIG. 9 is a plan view of an RFID tag 406 according to a sixth preferred embodiment of the present invention.

FIG. 9 is a plan view of an RFID tag 406 according to a sixth preferred embodiment of the present invention. The RFID tag 406 includes the antenna element 101 and two feed devices 301 and 302. The antenna element 101 preferably includes the base sheet 10 and the coil conductor 11 provided on the upper surface thereof. The feed devices 301 and 302 preferably are the feed devices described in the first preferred embodiment and each constituted by the feed element and the RFIC.

As illustrated in this figure, the feed devices 301 and 302 may be disposed at two positions in the coil conductor 11 of the antenna element 101 respectively. The feed device 301 may be of a different type from the feed device 302, which supports an RFID of a different system. Accordingly, the single antenna element 101 can be used among different systems.

Seventh Preferred Embodiment

Figure 10:
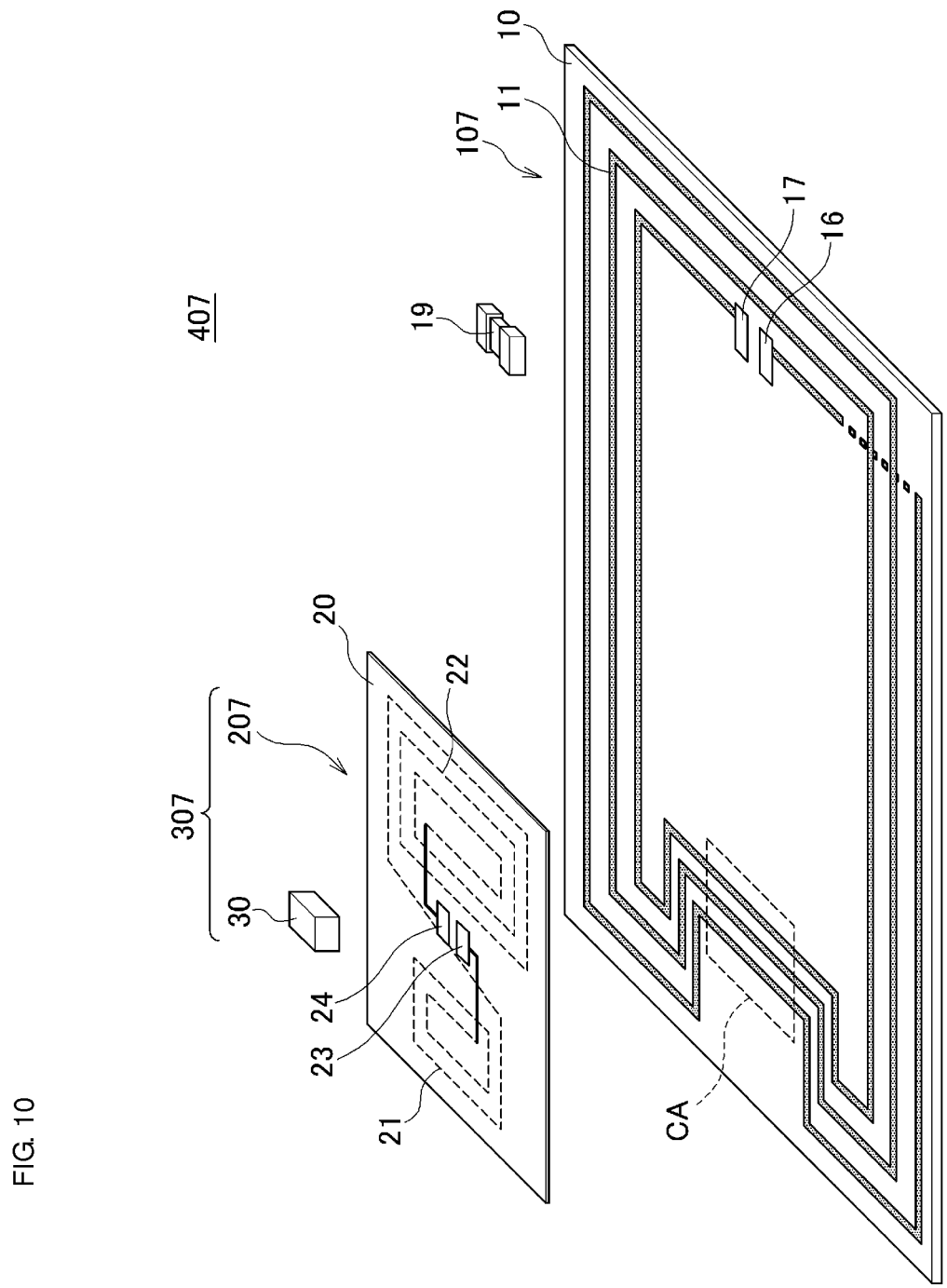
FIG. 10 is an exploded perspective view of an RFID tag 407 according to a seventh preferred embodiment of the present invention.
Figure 11:
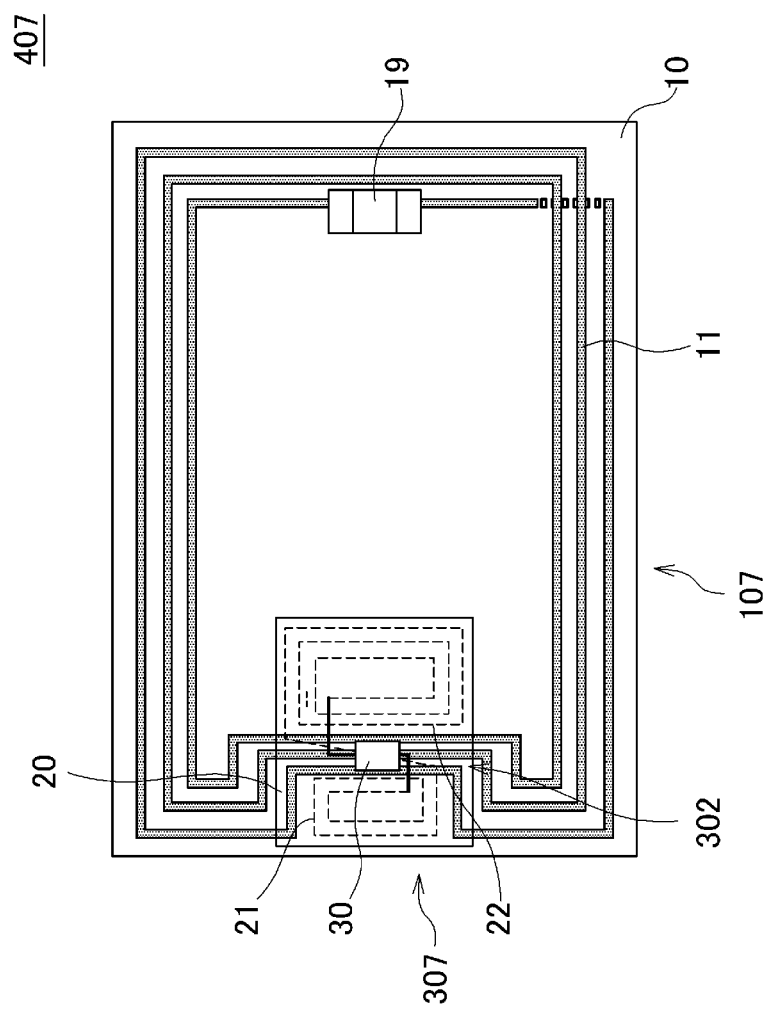
FIG. 11 is a plan view of the RFID tag 407.

FIG. 10 is an exploded perspective view of an RFID tag 407 according to a seventh preferred embodiment of the present invention. FIG. 11 is a plan view of the RFID tag 407.

In this example, the RFID tag 407 includes an antenna element 107 and a feed device 307. The antenna element 107 preferably includes the base sheet 10 and the coil conductor 11 located on the upper surface thereof. The feed device 307 preferably includes a feed element 207 and the RFIC 30.

The antenna element 107 is different from the antenna element 101 described in the first preferred embodiment and in which terminals 16 and 17 are located in the middle of the coil conductor 11 to mount a capacitive element 19. By mounting the capacitive element 19 on the terminals 16 and 17, the capacitative element 19 is inserted in series into the coil conductor 11. The coil conductor 11 and the capacitative element 19 together constitute an LC resonance circuit.

Furthermore, the antenna element 107 is different from the antenna element 101 described in the first preferred embodiment and in which the pattern of the coil conductor 11 is arranged such that the coupling portion CA is recessed toward the inner side portion of the coil opening. By shifting the coupling portion CA toward the inner side portion of the base sheet 10 in this manner, the position (adhering position) of the feed device 307 is accordingly shifted in the inward direction of the base sheet 10. As a result, the size of the entire RFID tag is reduced.

The feed element 207 is constituted by the base sheet 20 and the first coil conductor 21 and the second coil conductor 22 located on the upper surface of the base sheet 20. Terminals 23 and 24 to connect the RFIC 30 are located on the base sheet 20. The feed element 207 is different from the feed element 201 described in the first preferred embodiment in that the first coil conductor 21 and the second coil conductor 22 are asymmetric to each other. More specifically, the first coil conductor 21 is preferably relatively smaller and arranged to face the position of the recessed portion of the coil conductor 11 of the antenna element 107. The second coil conductor 22 faces the coil opening of the coil conductor 11 of the antenna element 107 and therefore is allowed to have a sufficiently large size and is relatively larger. In this way, by making the first coil conductor 21 and the second coil conductor 22 asymmetric to each other, the size of the feed device is reduced while attaining the necessary number of windings.

Eighth Preferred Embodiment

In an eighth preferred embodiment of the present invention, an example of an RFID tag for a UHF-band RFID system is described.

Figure 12:
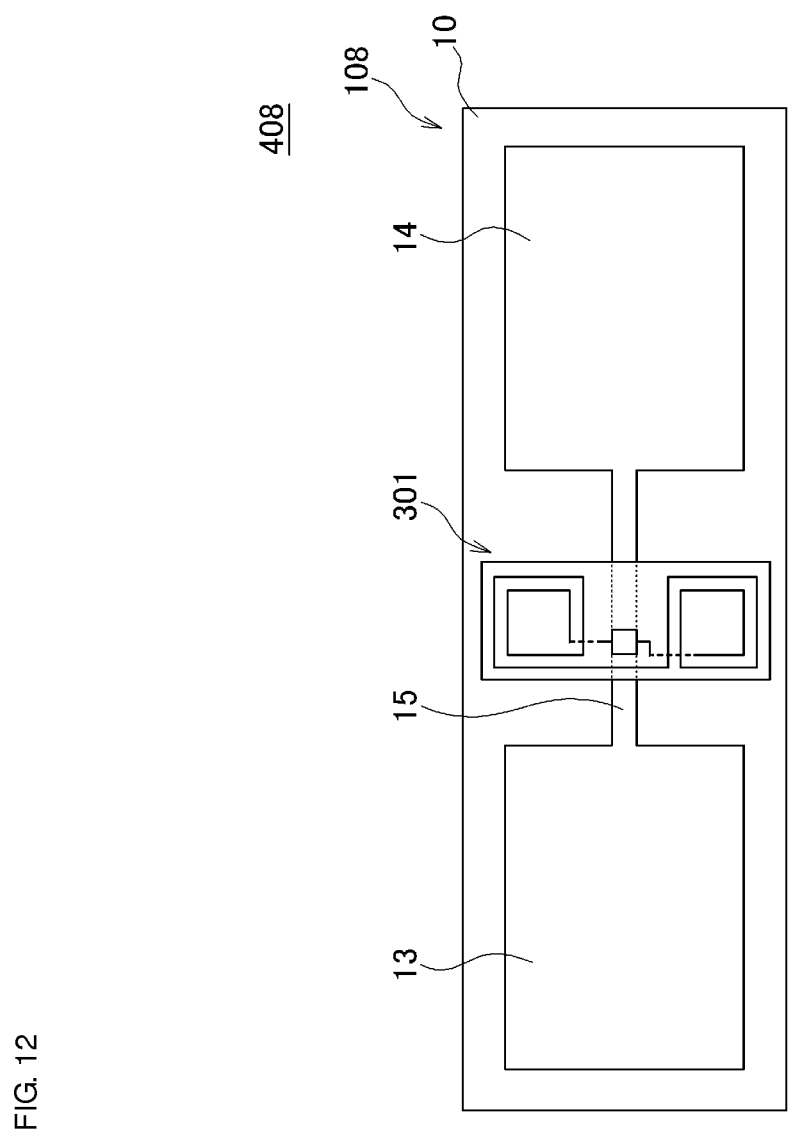
FIG. 12 is a plan view of an RFID tag 408 according to an eighth preferred embodiment of the present invention.

FIG. 12 is a plan view of an RFID tag 408 according to the eighth preferred embodiment. The RFID tag 408 includes an antenna element 108 and the feed device 301. The antenna element 108 preferably includes the base sheet 10, and radiation conductors 13 and 14 and a line portion 15 located on the upper surface thereof. The feed device 301 preferably is the feed device described in the first preferred embodiment.

The radiation conductors 13 and 14 and the line portion 15 in the antenna element 108 operate as a dipole antenna. The feed device 301 is coupled to the line portion 15 to feed electric power to the dipole antenna. Note that, in this preferred embodiment, the RFIC in the feed device 301 and the feed element that constitutes a closed magnetic circuit have a resonance point at a predetermined frequency and are in an impedance matched state.

Therefore, the antenna element 108 need not be structured to resonate at a predetermined frequency. In other words, the radiation conductors 13 and 14 may be conductors larger than the feed device 301.

Accordingly, in a wireless device such as a UHF-band RFID tag, the dipole antenna may be used, or a loop antenna, a patch antenna, or other types of antennas may be used. In any of such antenna elements, power feeding may be performed by magnetically coupling the antenna element to the coil conductor of the feed device.

Ninth Preferred Embodiment

Figure 13:
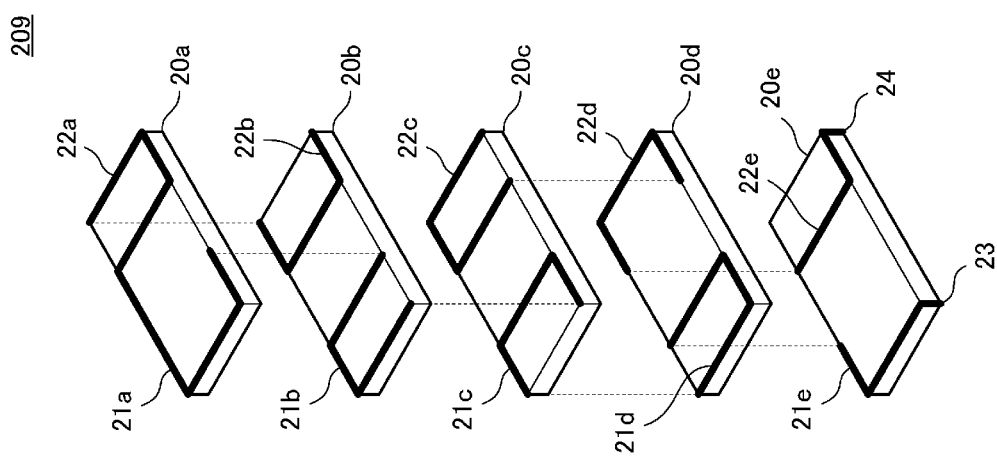
FIG. 13 is an exploded perspective view of a feed element 209 according to a ninth preferred embodiment of the present invention.

FIG. 13 is an exploded perspective view of a feed element 209 according to a ninth preferred embodiment of the present invention. The feed element 209 preferably includes a plurality of stacked insulator (for example, magnetic) base sheets on each of which a pattern of a coil conductor or the like is provided. Coil conductors 21a and 22a are provided on a base sheet 20a. Coil conductors 21b and 22b are provided on a base sheet 20b. Coil conductors 21c and 22c are provided on a base sheet 20c. Coil conductors 21d and 22d are provided on a base sheet 20d. Inter-layer connecting conductors are provided on the outer side surface of each of the base sheets.

The inter-layer connecting conductors described above are preferably arranged so as to be exposed on the outside of each of the base sheets, however, the inter-layer connecting conductors may be positioned in the inner side portion of each of the base sheets.

Figure 14:
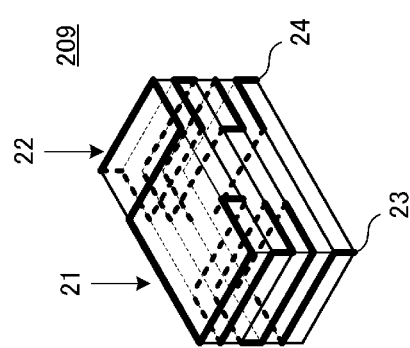
FIG. 14 is an external perspective view of the feed element 209.

FIG. 14 is an external perspective view of the feed element 209. Terminals 23 and 24 are led out to the underside of the rectangular or substantially rectangular parallelepiped stacked body.

In this way, the helical first coil conductor 21 and second coil conductor 22 are provided in a magnetic ceramic multilayer substrate.

Figure 15:
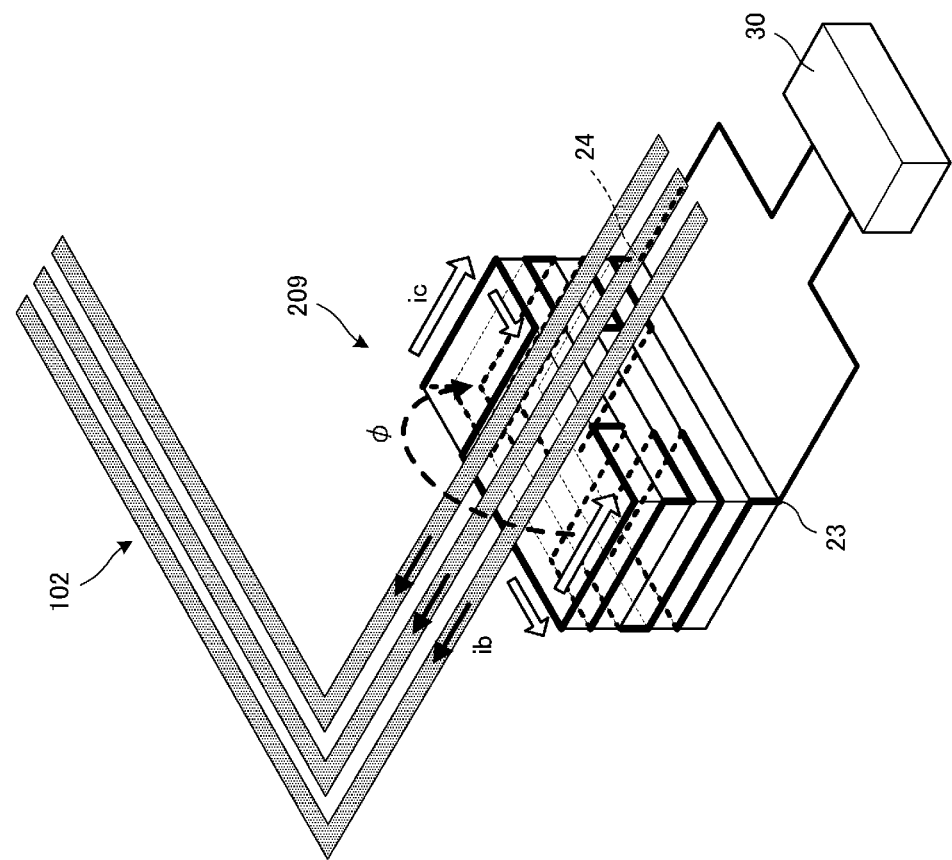
FIG. 15 is a partial perspective view illustrating coupling between the antenna element 102 and the feed element 209 that operate as a resonance booster.

FIG. 15 is a partial perspective view illustrating coupling between the antenna element 102 and the feed element 209 that operate as a resonance booster. The basic structure of the antenna element 102 is as illustrated in FIG. 4A and FIG. 4B. The RFIC 30 is connected to the feed element 209. As illustrated in this figure, the feed element 209 is disposed, for example, below the coil conductor of the antenna element 102.

Although not illustrated in FIG. 15, a matching circuit, a filter circuit, and the like are connected between the feed element 209 and the RFIC 30.

Figure 16:
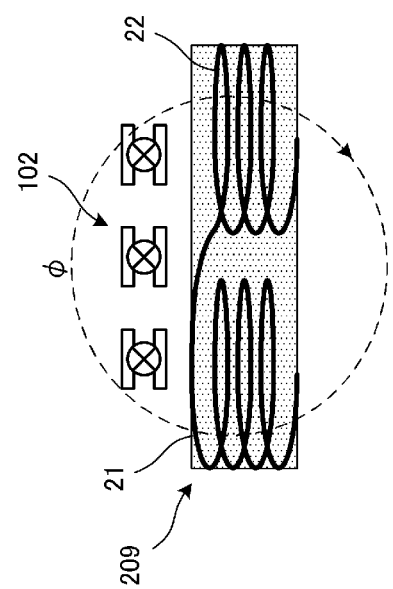
FIG. 16 is a conceptual diagram illustrating magnetic coupling between the antenna element 102 and the feed element 209.

FIG. 16 is a conceptual diagram illustrating magnetic coupling between the antenna element 102 and the feed element 209. The magnetic flux $\phi$ is generated by the first coil conductor 21 and the second coil conductor 22 and is interlinked with the coil conductor of the antenna element 102. The cross symbol in FIG. 16 represents the direction of the current that flows through the coil conductor.

Figure 17:
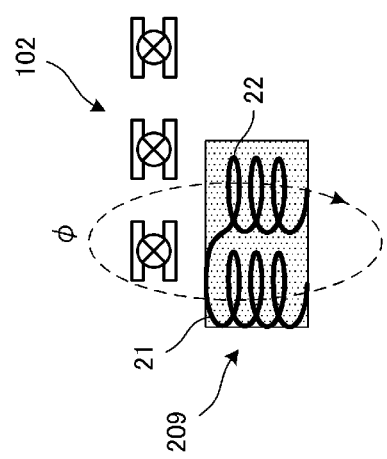
FIG. 17 is a conceptual diagram illustrating another magnetic coupling between the antenna element 102 and the feed element 209.

FIG. 17 is a conceptual diagram illustrating another magnetic coupling between the antenna element 102 and the feed element 209. As illustrated in this figure, the magnetic flux generated by the first coil conductor 21 and the second coil conductor 22 may be partially interlinked with the coil conductor of the antenna element 102.

Tenth Preferred Embodiment

Figure 18:
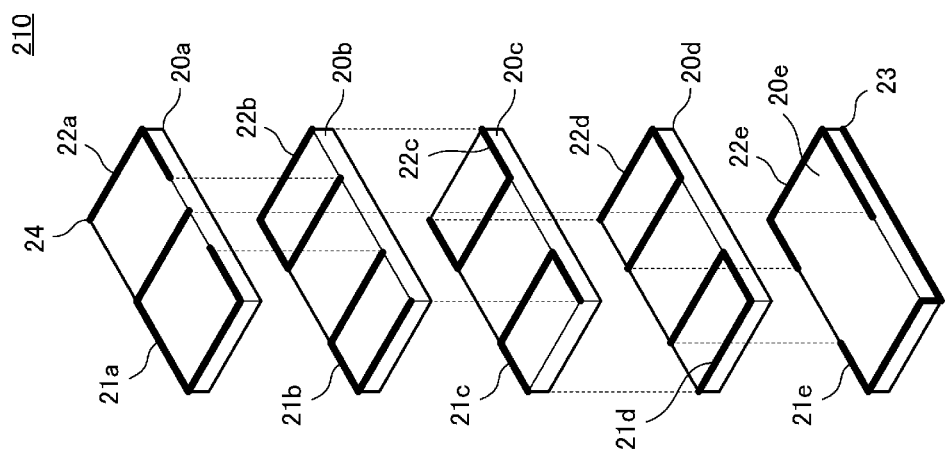
FIG. 18 is an exploded perspective view of a feed element 210 according to a tenth preferred embodiment of the present invention.

FIG. 18 is an exploded perspective view of a feed element 210 according to a tenth preferred embodiment of the present invention. The feed element 210 preferably includes a plurality of stacked insulator (for example, magnetic) base sheets on each of which a pattern of a coil conductor or the like is provided. The feed element 210 is different from the feed element 209 illustrated in FIG. 13 in the pattern of the coil conductor or the like on each of the base sheets.

Figure 19:
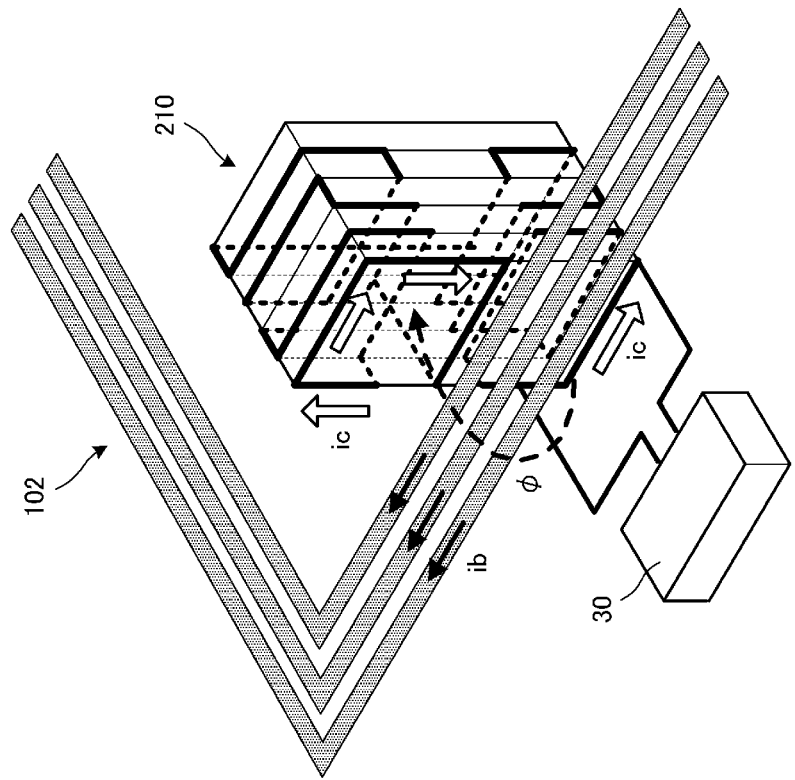
FIG. 19 is a partial perspective view illustrating coupling between the antenna element 102 and the feed element 210 that operate as a resonance booster.

FIG. 19 is a partial perspective view illustrating coupling between the antenna element 102 and the feed element 210 that operate as a resonance booster. As illustrated in this figure, the feed element 210 is disposed, for example, beside the coil conductor of the antenna element 102.

Although not illustrated in FIG. 19, a matching circuit, a filter circuit, and the like are connected between the feed element 210 and the RFIC 30.

Figure 20:
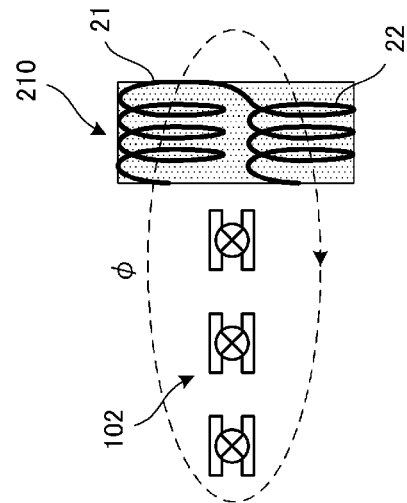
FIG. 20 is a conceptual diagram illustrating magnetic coupling between the antenna element 102 and the feed element 210.

FIG. 20 is a conceptual diagram illustrating magnetic coupling between the antenna element 102 and the feed element 210. The magnetic flux $\phi$ is generated by the first coil conductor 21 and the second coil conductor 22 and is interlinked with the coil conductor of the antenna element 102. The cross symbol in FIG. 20 represents the direction of the current that flows through the coil conductor.

Figure 21:
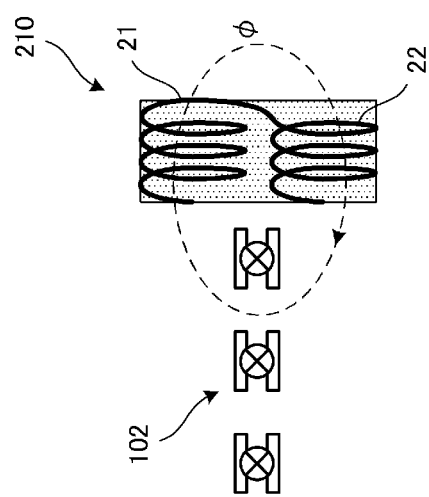
FIG. 21 is a conceptual diagram illustrating another magnetic coupling between the antenna element 102 and the feed element 210.

FIG. 21 is a conceptual diagram illustrating another magnetic coupling between the antenna element 102 and the feed element 210. As illustrated in this figure, the magnetic flux generated by the first coil conductor 21 and the second coil conductor 22 may be partially interlinked with the coil conductor of the antenna element 102.

Eleventh Preferred Embodiment

Figure 22:
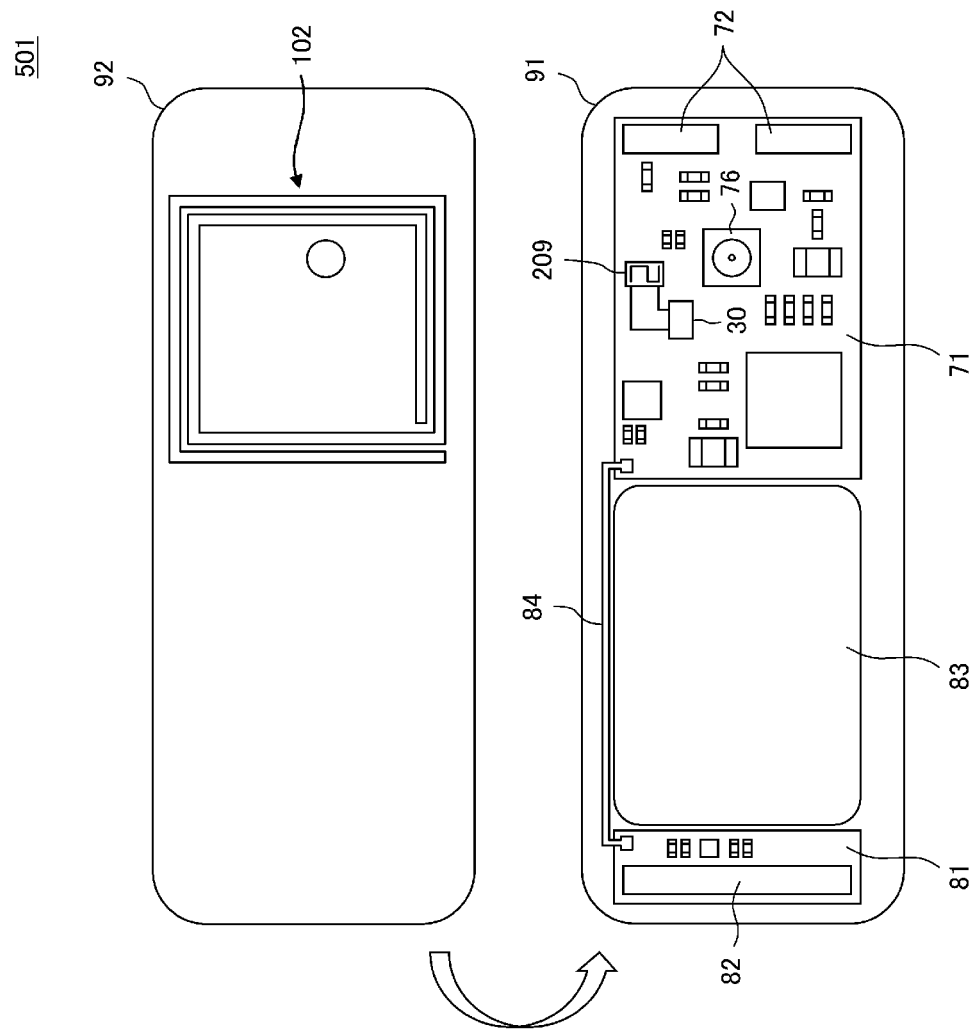
FIG. 22 is a diagram illustrating the structure of the interior of a housing of a wireless communication apparatus 501 according to an eleventh preferred embodiment of the present invention.

FIG. 22 is a plan view illustrating the structure of the interior of a housing of a wireless communication apparatus 501 according to an eleventh preferred embodiment of the present invention in a state where a lower housing 91 is isolated from an upper housing 92 so that the interior is exposed. Printed wiring boards 71 and 81, a battery pack 83, and the like are accommodated inside the lower housing 91. The RFIC 30 including a communication circuit and the feed element 209 are mounted on the printed wiring board 71. The structure of the feed element 209 is as illustrated in FIG. 13 and FIG. 14. A UHF-band antenna 72, a camera module 76, and the like are also mounted on the printed wiring board 71. On the printed wiring board 81, a UHF-band antenna 82 and the like are mounted. The printed wiring board 71 is connected to the printed wiring board 81 via a coaxial cable 84.

On the inner surface of the upper housing 92, the antenna element 102 is provided. The antenna element 102 is as illustrated in FIG. 4A and FIG. 4B. The antenna element 102 is magnetically coupled to the coil conductor of the antenna device 209 to thus operate as a magnetic antenna.

The coil conductor of the antenna device 209 and the antenna element 102 are disposed so as to be magnetically coupled to each other.

In the preferred embodiments described above, the antenna element 102 preferably is a coil conductor including a one-layer or two-layer structure, however, the number of layers is not specifically limited.

In the preferred embodiments described above, a portion of the coil conductor of the antenna element is preferably used as the coupling portion CA, however, a specific pattern for coupling that is to be connected to the antenna element may be provided apart from the antenna element.

In some of the preferred embodiments described above, an example is shown in which the first coil conductor 21 and the second coil conductor 22 are preferably connected in series with respect to the RFIC, however, the conductors may be connected in parallel.

The RFIC 30 described in the preferred embodiments described above may be structured as a bare chip IC or a package IC. For the package IC, a matching circuit may be provided on a package substrate.

The wireless device according to various preferred embodiments of the present invention may be applied to a reader/writer in addition to the RFID tag. Furthermore, the wireless device according to various preferred embodiments of the present invention may be applied to a wireless system other than an RFID system, such as a GPS receiving circuit, a wireless LAN, or a digital TV.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   an antenna element including a coupling portion; and
   a feed element including a first coil conductor and a second coil conductor, the first coil conductor and the second coil conductor being arranged such that magnetic flux generated in the first coil conductor and the second coil conductor constitutes a closed magnetic circuit; wherein
   the feed element and the antenna element are arranged such that the closed magnetic circuit of the feed element extends around the coupling portion of the antenna element;
   the antenna element includes a spiral or loop-shaped coil conductor;
   the coupling portion is part of the spiral or loop-shaped coil conductor; and
   the feed element is disposed across the coupling portion of the antenna element such that the first coil conductor and the second coil conductor are positioned on respective sides of the coupling portion.

2. The antenna device according to claim 1, wherein the first coil conductor and the second coil conductor respectively have different winding axes and are electrically connected in series to each other.

3. The antenna device according to claim 1, wherein the first coil conductor and the second coil conductor are disposed adjacent to each other on a same plane.

4. The antenna device according to claim 1, wherein the first coil conductor and the second coil conductor are asymmetric to each other.

5. The antenna device according to claim 1, wherein the first coil conductor and the second coil conductor are located on a same base sheet.

6. The antenna device according to claim 1, wherein the antenna element has a resonance frequency that corresponds to a carrier frequency of a communication signal.

7. The antenna device according to claim 1, wherein the antenna element includes a third coil conductor and a fourth coil conductor arranged in a rectangular or substantially rectangular spiral pattern and having winding directions opposite to each other.

8. The antenna device according to claim 7, wherein the third coil conductor and the fourth coil conductor define an LC circuit.

9. The antenna device according to claim 1, wherein the feed element includes a plurality of dielectric base sheets each including a coil conductor pattern located thereon, and via conductors defining inter-layer connections.

10. A wireless device comprising:
    an antenna element including a coupling portion; and
    a feed element including a first coil conductor and a second coil conductor, the first coil conductor and the second coil conductor being arranged such that magnetic flux generated in the first coil conductor and the second coil conductor constitutes a closed magnetic circuit; wherein
    the feed element and the antenna element are arranged such that the closed magnetic circuit of the feed element extends around the coupling portion of the antenna element;
    the antenna element includes a spiral or loop-shaped coil conductor;
    the coupling portion is part of the spiral or loop-shaped coil conductor; and
    the feed element is disposed across the coupling portion of the antenna element such that the first coil conductor and the second coil conductor are positioned on respective sides of the coupling portion.

11. The wireless device according to claim 10, further comprising a radio frequency integrated circuit that is connected to the first coil conductor and the second coil conductor of the feed element.

12. The wireless device according to claim 11, wherein the radio frequency integrated circuit and the feed element constitute a resonant circuit that resonates at a frequency corresponding to a carrier frequency of a communication signal.

13. The wireless device according to claim 10, wherein the first coil conductor and the second coil conductor respectively have different winding axes and are electrically connected in series to each other.

14. The wireless device according to claim 10, wherein the first coil conductor and the second coil conductor are disposed adjacent to each other on a same plane.

15. The wireless device according to claim 10, wherein the first coil conductor and the second coil conductor are asymmetric to each other.

16. The wireless device according to claim 10, wherein the first coil conductor and the second coil conductor are located on a base sheet.

17. The wireless device according to claim 10, wherein the antenna element has a resonance frequency that corresponds to a carrier frequency of a communication signal.

18. The wireless device according to claim 10, wherein the wireless device is one of an RFID tag, a GPS receiving circuit, a wireless LAN, and a digital TV.

* * * * *